United States Patent [19]

Christon

[11] 4,048,759

[45] Sept. 20, 1977

[54] TURNTABLE SUPPORT STRUCTURE FOR RADIUS MILLS AND THE LIKE

[76] Inventor: Robert H. Christon, 1293 S. Race St., Denver, Colo. 80210

[21] Appl. No.: 740,413

[22] Filed: Nov. 10, 1976

[51] Int. Cl.$^2$ ............................ B24B 5/00; B24B 41/02
[52] U.S. Cl. ...................................... 51/97 R; 51/234; 308/72
[58] Field of Search ..................... 51/96, 97 R, 97 NC, 51/234, 291; 308/2 R, 72, 194

[56] References Cited

U.S. PATENT DOCUMENTS

| 1,156,292 | 10/1915 | Johnson | 51/97 R |
|---|---|---|---|
| 2,076,508 | 4/1937 | Van Norman | 51/97 R |
| 2,188,675 | 1/1940 | Cramer | 51/97 R |
| 3,451,646 | 6/1969 | Aarnaes | 308/72 X |

Primary Examiner—James L. Jones, Jr.
Assistant Examiner—Nicholas P. Godici
Attorney, Agent, or Firm—Edwin L. Spangler, Jr.

[57] ABSTRACT

This invention relates to an improved three-point support subassembly for pivoted machine tool turntables that is characterized by a pair of floating pads retained in cavities on the underside of the turntable that slide along the opposed planar surface of a stationary bedplate therebeneath and a ball and socket pivotal connection that allows the turntable to swing on a vertical axis defined by the latter as well as tilt relative thereto. The stem portion of the pin is journalled for rotation about a vertical axis in the bedplate while the spherical portion atop said stem is connected to the turntable for conjoint movement in a horizontal plane due to a loose fitting coupling therebetween. The socket journalling the spherical portion of the pivot pin includes upper and lower segments independently adjustable relative to one another and to the turntable for purposes of leveling the latter. Adjustable abutments also engage the pads and are used to raise or lower the turntable relative thereto.

16 Claims, 10 Drawing Figures

U.S. Patent  Sept. 20, 1977  Sheet 1 of 3  4,048,759
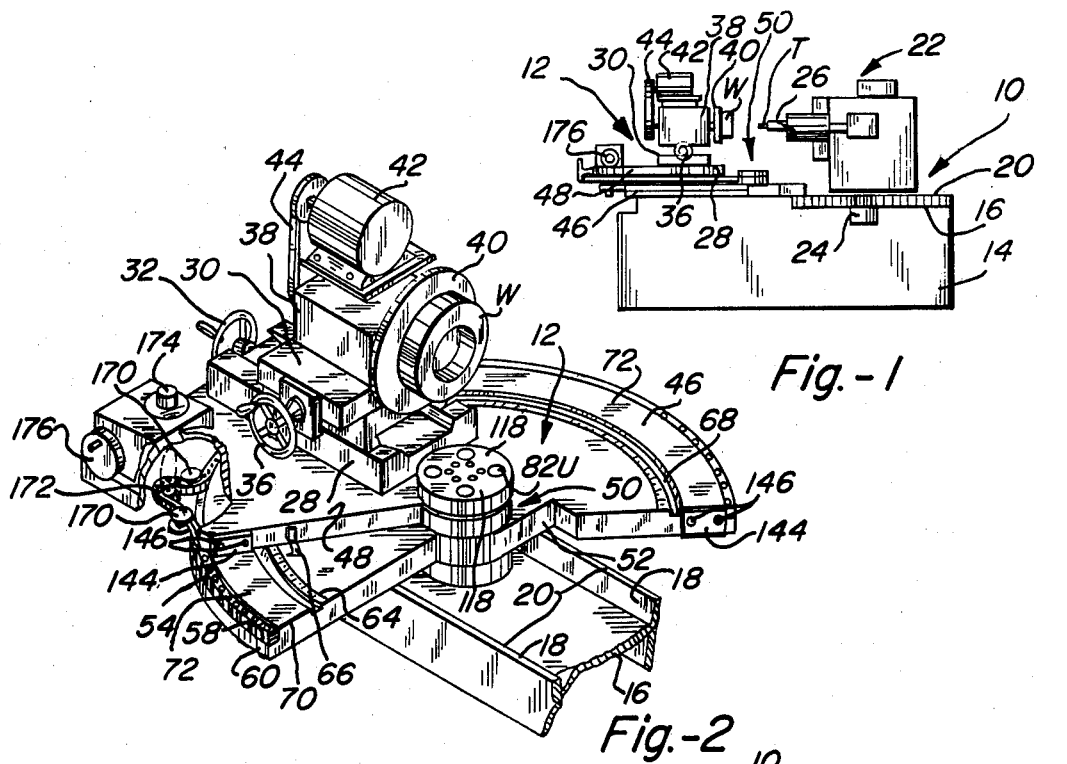
Fig.-1
Fig.-2
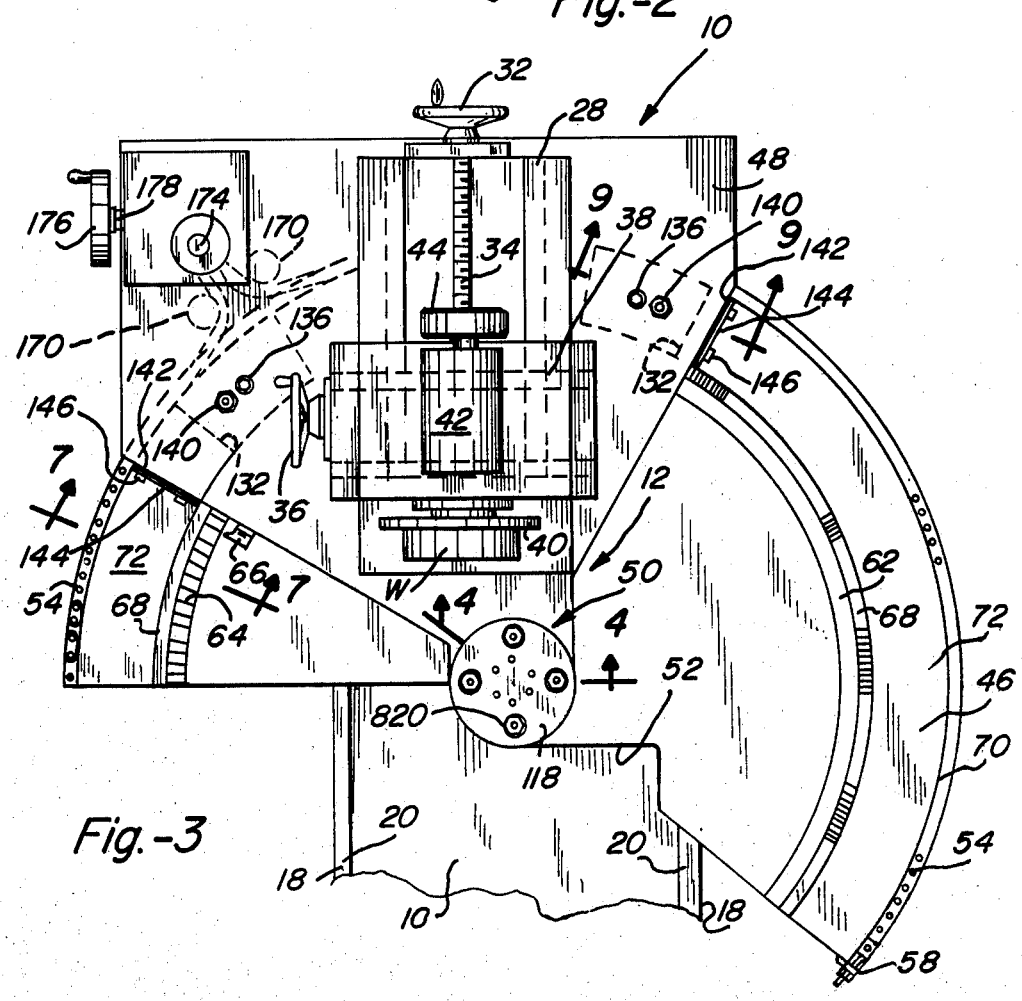
Fig.-3

TURNTABLE SUPPORT STRUCTURE FOR RADIUS MILLS AND THE LIKE

Radius grinding mills of various descriptions are widely used in both the precision metal working and optical industries. Certain machines of this type are employed to grind or otherwise machine internal curved surfaces while others are used to produce external ones. Internal radius mills such as are commonly used in metal working customarily have the grinding tool "chucked" or otherwise releasably fastened in a tool-carrying carriage that moves toward and away from the workpiece at a controlled rate along a suitable track of some sort. The workpiece, on the other hand, is similarly mounted in a suitable holder which both rotates and is adjustable from side to side as well as toward and away from the tool. A fixed bedplate customarily sits atop the track along which the tool moves and is provided with appropriate scales to indicate the angle the workpiece makes with respect to the main fore-aft axis of the mill. Pivotally mounted atop this bedplate sits a turntable which swings from side to side relative to the tool or workpiece. Depending upon whether the tool is used to cut internal or external surfaces, a common problem exists, namely, that of maintaining the axis of pivotal movement of the turntable precisely perpendicular to the plane in which the latter swings. More specifically, the prior art machines are so constructed that the pivotal connection between the turntable and bedplate cannot effectively accommodate any unevenness in the latter with the result that the turntable binds during its excursion and produces imperfections in the workpiece.

It has now been found in accordance with the teaching of the instant invention that these and other shortcomings of the prior art radius mills can, in large measure, be eliminated by the simple, yet unobvious, expedient of mounting the turntable on a pivot which accommodates relative tiltable movement while, at the same time, journalling the pivot pin within a socket in the turntable that can be raised or lowered as needed to level the latter in relation to a pair of pads that cooperate therewith to define a three-point support. The socket comprises upper and lower bearing segments that are independently adjustable relative to one another and to the turntable so that they can be used to restore the turntable to a level condition. The stem portion of the pin is journalled for rotation in the bedplate but is prevented from moving vertically relative thereto. To insure that the pin will rotate in its journal rather than the socket housing the ball atop thereof, the pin is loosely coupled to the turntable for conjoint movement in a horizontal plane.

It is, therefore, the principal object of the present invention to provide a novel and improved turntable support structure for the turntable of radius mills and the like.

A second objective is the provision of a device of the character described which readily compensates for unevenness in the turntable supporting surface.

Another object of the invention herein disclosed and claimed is to provide a vertically-adjustable two-part bearing structure that defines a socket for the ball atop the turntable pivot that enables the turntable to be leveled.

Still another object is the provision of a socket bearing for a ball and socket universal coupling in which the socket is formed in two parts, both of which are independently adjustable relative to one another and to the support therefor.

An additional object of the within-described invention is the provision of a turntable-leveling mechanism wherein the height of the turntable at the axis of pivotal movement thereof is raised and lowered by using the upper segment of a two-part socket bearing as a movable abutment resting atop the truncated spherically shaped head of the pivot pin.

Further objects are the provision of a machine tool turntable leveling apparatus which is simple, versatile, easy to adjust, accurate, maintenance free and readily adaptable for use with various types and designs of countour grinders.

Other objects will be in part apparent and in part pointed out specifically hereinafter in connection with the description of the drawings that follows, and in which:

FIG. 1 is a side elevation outlining the general configuration and arrangement of one type of contour grinder to which the instant invention is applicable;

FIG. 2 is a fragmentary perspective view showing the arcuately movable turntable and associated structure to a greatly enlarged scale, portions of said turntable having been broken away to reveal the interior details;

FIG. 3 is a fragmentary top plan view of the structure of FIG. 2 to a still further enlarged scale;

Figure 7:
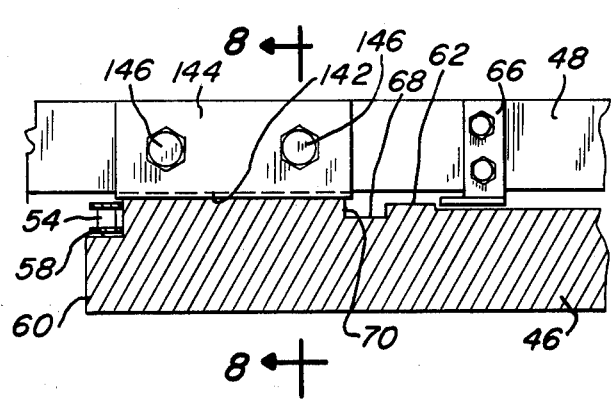
FIG. 7 is a fragmentary section taken along line 7—7 of FIG. 3 but to a scale smaller than that of FIGS. 4, 5 and 6.
Figure 8:
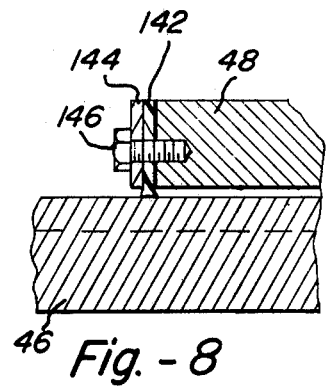
FIG. 8 is a fragmentary section taken along line 8—8 of FIG. 7.
Figure 9:
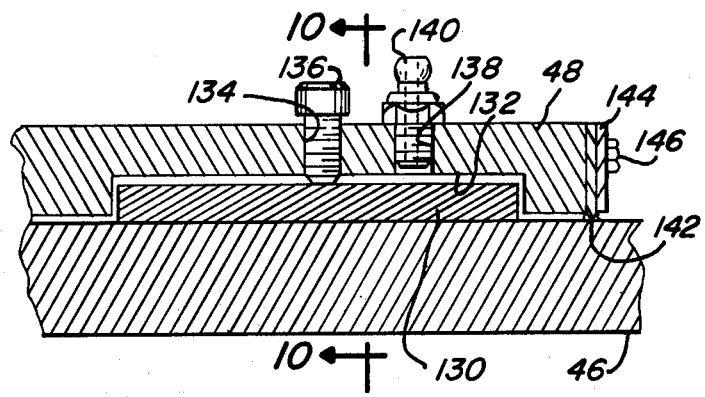
Figure 10:
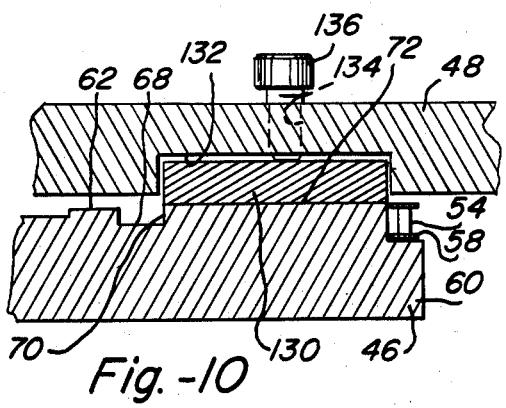

FIG. 9 is a fragmentary section taken along line 9—9 of FIG. 3 to the same scale as FIGS. 7 and 8; and, FIG. 10 is a section taken along line 10—10 of FIG. 9.

Referring next to the drawings for a detailed description of the present invention and, initially, to FIGS. 1, 2 and 3 for this purpose, reference numeral 10 has been employed to broadly designate a contour grinding apparatus of the general type for which the turntable support subassembly forming the subject matter hereof is suited for use while numeral 12 similarly designates the latter subassembly. Contour grinders and other machine tools of this general description are customarily mounted atop a stand 14 of some sort which includes as a part thereof an elongate bed 16 having parallel rails 18 which cooperate to define a track 20.

Mounted atop this track 20 is a tool carriage that has been indicated in a general way by numeral 22 and which is movable thereon both toward and away from the workpiece W by means of a motor drive mechanism 24 that has not been shown in detail but which functions to advance and retract the tool T at a controlld rate selected by the operator. The tool is releasably held in a tool chuck 26 of conventional design which holds it in the proper attitude against the workpiece. The tool, tool carriage and drive therefor along with other appurtenances associated with the tool are of conventional design and, as such, form no part of the instant invention.

To a lesser extent, the same is true of the turntable subassembly 12 which includes a number of conventional structures upon which no novelty is predicated. Among these are such items as the track 28 along which the workpiece carriage 30 rides to adjust the workpiece W relative to tool T. As illustrated, this carriage 30 is moved toward and away from the tool manually by actuating handwheel 32 which, in turn, operates a lead screw 34 threaded into said carriage. A second handwheel 36 on the side of the carriage moves a subcarriage 38 from side to side. This subcarriage 38 journals the workpiece chuck 40 for rotational movement about a horizontal axis. An electric motor 42 atop the subcarriage drives the workpiece chuck through a belt and pulley drive 44.

The novelty in the instant invention resides in the support mechanism by means of which the turntable 48 is mounted atop bedplate 46 for limited arcuate movement about a pivot subassembly which has been broadly designated by reference numeral 50. With particular reference to FIGS. 2, 3, 4, 7, 8, 9 and 10, the bedplate 46 can be seen to comprise a large sector-shaped steel plate 20 permanently fastened atop bed 16 at the end thereof opposite that along which the tool carriage 22 moves. As illustrated, the bedplate encompasses an arc of somewhere around 225° or so and it is notched as shown at 52 to receive the tool carriage 22 at the extreme of its forward travel. One end of a sprocket chain 54 is attached to an end of the bedplate and reaved around the circumferential margin thereof to the other end where it is secured with an adjustable connection 56 (FIG. 3) that enables the chain to be tightened. As shown, the chain is supported atop a ledge 58 created by marginal flange 60. An arcuate rib 62 spaced inwardly of the flange 60 but in concentric relation thereto carries a scale 64 along which pointer 66 carried by the turntable rides. Scale 64 and pointer 66 cooperate in the usual manner to indicate the position of turntable and workpiece-holding structure supported thereon in relation to the bedplate and bed 16.

An arcuate groove 68 borders the rib 62 containing the scale 64 on the outside edge thereof. This groove and flange 60 cooperate to define a raised platform 70 of arcuate configuration. The upwardly facing surface 72 of this platform is machined flat so as to produce a planar surface perpendicular to the axis of pivotal movement of the turntable 48 as the latter is defined by pivot subassembly 50 to be described in detail presently.

At the center of the bedplate fastened within a central opening 74 in the latter is a bearing housing 76 which is most clearly revealed in FIG. 4 to which detailed reference will now be made. This housing is bordered on its lower edge by a marginal flange 78, the upper surface of which defines a ledge 80 atop which the bedplate rests. Bolts 82 within bolt-receiving openings 84 in the flange screw into tapped holes 86 in the underside of the bedplate to complete the connection.

Axial opening 88 within the bearing housing has counterbores 90 at opposite ends thereof that terminate in shoulders 92 against which the outer conical races 94 of thrust bearings 96 rest. These bearings are of the commonplace tapered roller conical race-type used to journal shafts or elements like the stem portion 98 of pivot pin 100 subject to axial thrust. The inner race 102U of the upper bearing 96U abuts downwardly-facing annular shoulder 104 on the stem portion 98 of pin 100. The inner race 102L of the lower thrust bearing 96L, on the other hand, rests atop nut 106 which is screwed onto threaded section 108 at the lower end of the pin. This nut forms a movable abutment which cooperates in the usual way with fixed abutment 104 to preload the thrust bearings 96U and 96L. A coverplate 108 is detachably fastened to the underside of the bearing housing in position to cover the exposed lower end of the pin.

The upper extremity of the pin comprises a truncated ball 110 formed integral with the stem and provided with a pin-receiving recess offset to one side of the pin axis in parallel relation thereto. This pin-receiving recess carries a pin 114 which projects well above the ball in position to enter and be loosely retained within oversize recess 116 in the underside of cap member 118, certain other details of which will be described presently. In the particular form shown, the opposed surfaces of the bearing housing and cap are provided with an interlocking tongue 120 and groove 122. The tongue is an upstanding annular one formed integral with respect to the downwardly-opening cylindrical cavity 124 in the underside of cap 118 that houses the upper and lower segments 126U and 126L, respectively, of two-part socket 128 for independent axial adjustment relative to one another and to the turntable itself as will be described presently. Before doing so, however, a better understanding of the entire turntable support subassembly can best be had by looking next at the floating pads 130 which cooperate with pin 100 to define the three-point support and for this purpose reference will next be made to FIGS. 4, 7, 8, 9 and 10.

Figure 4:
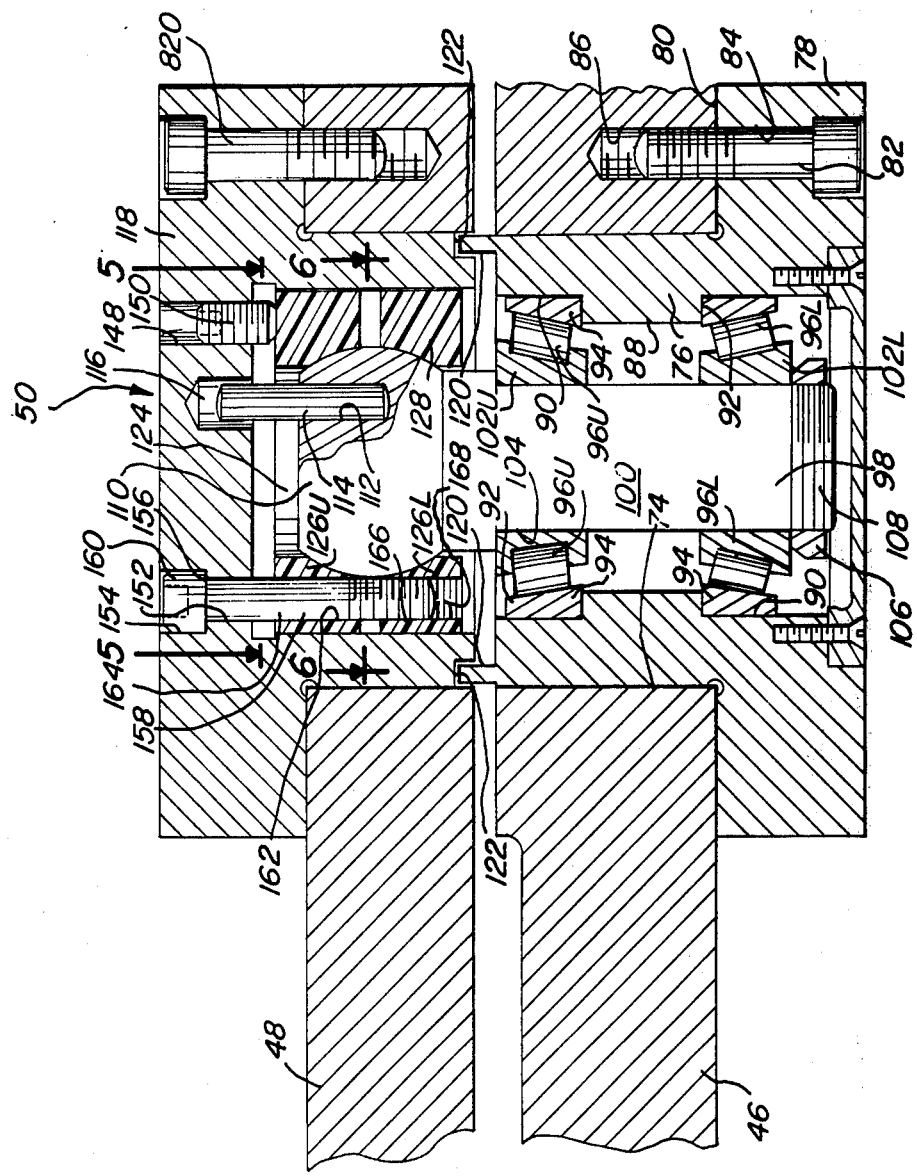
FIG. 4 is a fragmentary section taken along line 4—4 of FIG. 3 to an even larger scale.

In FIG. 4 it will be seen that the cap 118 actually forms the hub of turntable 48 to which it is rigidly bolted by bolts 82U. As illustrated, turntable 48 is a flat sector-shaped thick metal casting of approximately 90° in angular extent and about the same radius as the bedplate 46 atop which it rests and slides arcuately to and fro relative to the tool T. Looking at FIG. 9 and 10, it will be seen that the underside of turntable 48 is provided with an arcuately-spaced pair of shallow pad-receiving cavities 132 which open onto the machined surface 72 of the bedplate. A metal pad or slideblock 130 is loosely retained within each of these two cavities in position to slide along the machined surface 72 as the turntable is swung from side to side around the axis defined by pivot pin 100.

Centered within cavities 130 and opening onto the upper surface of the turntable are threaded openings 134 into which are screwed threaded members 136 that function as adjustable stops. As these stops are screwed in and out of their respective openings, they retract or extend the pads 130 on which they rest thus raising or lowering the outside corner of the turntable adjacent thereto with respect to the bedplate underlying the latter. Thus, by adjusting stops 136, the outside corners of the turntable can be brought into a level relationship with one another and that portion containing the hub-forming cap 118. Since the pads maintain the turntable in spaced relation to the bedplate and the pads themselves are free to tilt on their adjustable abutments 136, any unevenness in the machined surface 72 can be readily accommodated without the turntable binding during its swing about pivot pin 100. In the particular form shown, a second internally-threaded opening 138 (FIG. 9) is provided alongside opening 134 into which a conventional grease fitting 140 is screwed. These grease fittings enable grease to be injected into the oversize pad cavities 132 thus maintaining free-sliding contact of the pads atop the machined surface 72 of the turntable.

A look at FIGS. 7, 8 and 9 will reveal the presence of a wiper blade 142 held in place by a retaining plate 144 and a pair of bolts 146. A wiper subassembly of this type is provided on both radially-extending edges of the turntable where they pass over machined surface 72 of the bedplate as is most clearly revealed in FIG. 3. These wipers are fabricated from a flexible material and they function to sweep any grit, cuttings or other debris from the machined surface 72 before the pad can reach same.

Figure 5:
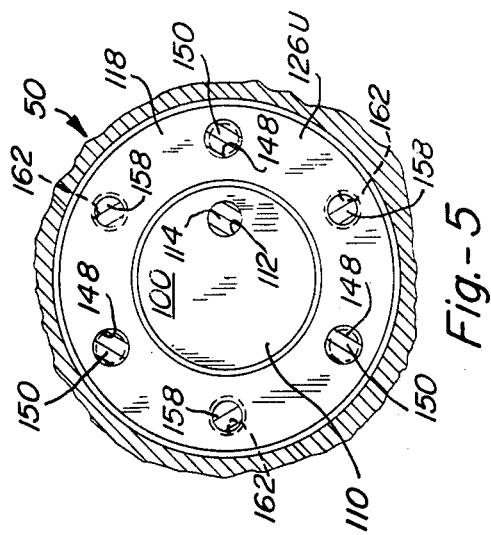
FIG. 5 is a fragmentary section taken along line 5—5 of FIG. 4.
Figure 6:
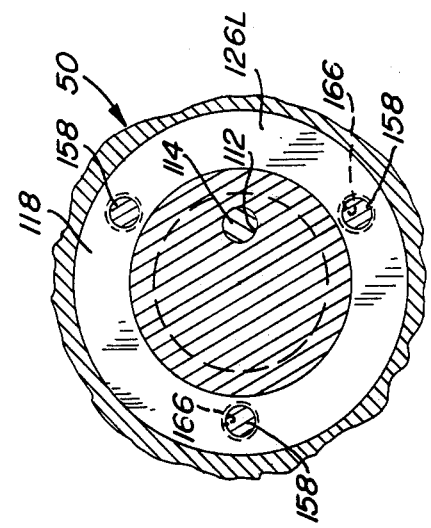
FIG. 6 is a fragmentary section taken along line 6—6 of FIG. 4.

Returning to FIG. 4 and looking at it along with FIGS. 5 and 6, the manner in which the segments 126 of the socket 128 can be independently adjusted relative to one another and to the turntable itself, will now be described. First of all, it will be seen that cap 118 has three equiangularly spaced internally threaded openings 148 which open into pin-receiving cavity 124 over the upper segment 126U of the socket bearing 128. These openings each receive a set screw 150 which cooperate with one another to define vertically-adjustable abutments or stops which locate the upper socket bearing segment 126U within its cavity. Thus, by adjusting set screws 150, the vertical position of the hub of the turntable relative to pivot pin 100 can be adjusted. This adjustment together with the independently adjustable pads enables the turntable to be leveled and kept level.

Still another set of three equiangularly-spaced openings 152 are provided in the cap interspersed among the set screw openings; however, they differ from the latter in that they are smooth-bored and include emlarged portions 154 at their upper end which define upwardly-facing shoulders 156, all of which are most clearly revealed in FIG. 4. Each of the latter openings loosely receives a cap screw 158 having a head 160 resting atop shoulder 156.

Vertically aligned with smooth-bored openings 152 are similar smooth-bored openings 162 in the upperr socket bearing segment 126U sized to receive the smooth-surfaced shank 164 of the cap screw. Registering internally-threaded openings 166 are provided in the lower socket bearing segment 126L into which the threaded shank portion 168 of the cap screw screws. Thus, by turning the three cap screws 160 one way or the other, the lower socket bearing segment 126L can be raised or lowered independently of the upper and relative to the latter so as to tighten or loosen the grip of bearing 128 on ball 110 of pin 100.

Now, the ball and socket pivotal connection just described permits the turntable to tilt relative to the bedplate without binding should the bearing surface 72 be uneven or contain some dirt or other obstruction. For all practical purposes, however, the relative motion between the ball and socket insofar as tilting movement is concerned is minimal to say the least. Of course, the turntable would be free to turn about a vertical axis on ball 110 were it not for the interlock therebetween provided by pin 114 and socket 116 in the cap. While this connection or coupling is a loose one, it still functions to operatively link the cap 118 to the pin 100 so the latter is forced to turn within the thrust bearings 96L and 96U journalling same in the bearing housing of the bedplate subassembly which is preferable from a mechanical standpoint to that of allowing significant relative rotational movement to occur between the ball and socket.

Finally, with brief reference once again to FIGS. 2 and 3, the drive mechanism by means of which the turntable 48 is swung relative to the bedplate will be described. At a point intermediate its ends, sprocket chain 54 is reaved between a pair of idlers 170 located alongside the ledge 58 bordering bedplate 46 and around sprocket 172 as shown in FIG. 2. Sprocket 172 together with idlers 170 are, in fact, supported on the underside of the turntable 48 for movement therewith. A reversible table drive motor (not shown) is operatively connected to drive shaft 174 and functions to turn sprocket 172 to swing the turntable at a uniform preselected rate. Handwheel 176 is also capable of being operatively coupled to drive shaft 174 through shaft 178 thus enabling the table to be swung manually.

What is claimed is:

1. In a contour grinding machine of the type having an elongated bed, a tool-carrying carriage movable longitudinally of said bed, a horizontally-disposed bedplate resting in fixed position upon said bed in the path of the tool-carrying carriage, a turntable mounted atop the bedplate for relative movement along the surface thereof about a vertical axis, and a second carriage for carrying a workpiece mounted stop the turntable for movement therewith about said vertical axis as well as independent movement relative thereto and to the tool-carrying a workpiece mounted atop the turntable for assembly which comprises: a pair of pads depending from the underside of the turntable in spaced relation to one another and to said vertical axis of turntable movement positioned and adapted to slide along the upturned surface of the bedplate; a pivot pin located at the vertical axis of turntable movement cooperating with the pads to define a three-point turntable support, said pivot pin including a stem portion journalled for rotation in the bedplate about said axis of turntable movement and a ball atop said stem portion having a spherical surface whose center lies on said axis; a bearing-receiving cavity in the underside of the turntable positioned and sized to loosely receive the pivot pin ball; an upper socket bearing segment having the underside thereof shaped to receive the top of the pivot pin ball for limited universal movement; first adjustment means mounting the upper socket bearing segment within said bearing-receiving cavity for vertical adjustment along said axis of turntable movement, said upper socket bearing segment and first adjustment means cooperating with one another upon actuation of the latter to raise and lower the portion of the turntable resting on the pivot pin relative to those portions supported on the pads; a lower socket bearing segment apertured and shaped to loosely receive the stem portion of the pivot pin and journal the underside of the pivot pin ball for limited universal movement when placed thereagainst; and, second adjustment means mounted the lower socket bearing segment within said bearing-receiving cavity for independent vertical adjustment along said axis of turntable movement, said second adjustment means being operative upon actuation in a manner to raise the lower bearing segment into contact with the underside of the pivot pin ball to complete the socket therefor and retain said turntable for limited tiltable movement effective to accommodate unevenness in the bedplate surface over which the pads slide.

2. The improvement as set forth in claim 1 in which: pad-receiving cavities are provided on the underside of the turntable shaped and sized to loosely receive the pads in recessed relation.

3. The improvement as set forth in claim 1 in which: the first adjustment means comprises at least one set screw threaded vertically through the turntable into the bearing-receiving cavity in position to engage the upper socket bearing segment and define an adjustable stop abutting same.

4. The improvement as set forth in claim 1 in which: the second adjustment means comprises at least two threaded members mounted for rotational movement in the turntable in position to extend into the bearing-receiving cavity and threadedly engage the lower socket bearing segment at angularly spaced points, said threaded members being operative upon rotation to raise and lower the lower socket bearing segment within the bearing-receiving cavity.

5. The improvement as set forth in claim 1 in which: a pin depending from one of said turntable and pivot pin ball elements is loosely received within a socket formed in an opposed surface of the other of said elements, said pin and socket when interengaged cooperating with one another to cause said turntable and pivot pin to rotate as a unit about the vertical axis defined by the latter.

6. The improvement as set forth in claim 1 in which: thrust bearings are provided in the bedplate journalling the stem of the pivot pin; and, in which the pivot pin includes a downwardly facing shoulder on the upper end of the stem portion and a detachable stop-forming element on the lower end thereof cooperating with one another and with the thrust bearings journalling said stem to prevent axial movement of said pin.

7. The improvement as set forth in claim 1 in which: means comprising a spacer is interposed between each pad and the opposed surface of the turntable, said spacer being effective to maintain the turntable and pads in spaced relation and permit said pads to tilt relative thereto so as to accommodate unevenness in the surface of the bedplate over which they slide.

8. The improvement is set forth in claim 2 in which: a spacer is interposed between each pad and the surface of the cavity overlying same, said spacer being effective to mount said pad for tiltable movement so as to accommodate unevenness in the bedplate surface over which it slides.

9. The improvememt as set forth in claim 3 in which: at least three set screws are arranged to engage the upper socket bearing segment at approximately equiangularly spaced points around the periphery thereof.

10. The improvement as set forth in claim 4 in which: the upper socket bearing segment is apertured to pass the threaded members for independent rotational and axial movement therein.

11. The improvement as set forth in claim 4 in which: at least three threaded members threadedly engage the lower socket bearing segment at approximately equiangularly spaced points adjacent the periphery thereof.

12. The improvement as set forth in claim 5 in which the pin and socket are so sized as to permit limited tiltable movement of the turntable relative to the pivot pin.

13. The improvement as set forth in claim 7 in which: the spacer comprises a vertically adjustable stop operative upon actuation to raise and lower that portion of the turntable resting atop the pad abutting same relative to the other two points of three-point turntable support.

14. The improvement as set forth in claim 7 in which: means accessible on the exposed surface of the turntable communicate the interior of the pad cavities, said means comprising fittings for the introduction of lubricants.

15. The improvement as set forth in claim 7 in which: the spacers are positioned to engage the pad at approximately the center thereof.

16. The improvement as set forth in claim 8 in which: the portion of the spacer exposed within the pad-receiving cavity is shorter than the depth of the latter so as to maintain said pad confined within the margins thereof.

* * * * *